United States Patent
Tanaami et al.

(10) Patent No.: US 8,993,180 B2
(45) Date of Patent: *Mar. 31, 2015

(54) METAL OXYGEN BATTERY

(75) Inventors: Kiyoshi Tanaami, Saitama (JP); Hiroshi Sakai, Saitama (JP); Bunichi Saito, Saitama (JP); Takuya Taniuchi, Saitama (JP); Mao Hori, Saitama (JP); Tomohiro Kinoshita, Saitama (JP); Satoshi Nakada, Saitama (JP); Izuru Kanoya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,921

(22) Filed: Sep. 12, 2012

(65) Prior Publication Data

US 2013/0095394 A1    Apr. 18, 2013

(30) Foreign Application Priority Data

Sep. 13, 2011  (JP) ................. 2011-199444
Sep. 11, 2012  (JP) ................. 2012-199199

(51) Int. Cl.
*H01M 12/06* (2006.01)
*H01M 12/08* (2006.01)

(52) U.S. Cl.
CPC ............ *H01M 12/06* (2013.01); *H01M 12/085* (2013.01); *H01M 12/065* (2013.01); *H01M 12/08* (2013.01)
USPC ............ 429/405; 429/402; 429/403; 429/404

(58) Field of Classification Search
None
See application file for complete search history.

(56) References Cited

U.S. PATENT DOCUMENTS

| 2005/0089738 | A1* | 4/2005 | Tao et al. .............. 429/27 |
| 2011/0165476 | A1 | 7/2011 | Pulskamp et al. |
| 2011/0195320 | A1* | 8/2011 | Nishikoori et al. .......... 429/403 |
| 2011/0305974 | A1 | 12/2011 | Nakanishi |
| 2012/0321968 | A1 | 12/2012 | Sato et al. |

FOREIGN PATENT DOCUMENTS

| JP | 2005-166685 A | 6/2005 |
| JP | 2007-307446 A | 11/2007 |

(Continued)

OTHER PUBLICATIONS

Read J. ("Characterization of the Lithium/Oxygen Organic Electrolyte Battery", J. Elechtrochem. Soc. 149 (9) A1190-A1195 2002.*

(Continued)

*Primary Examiner* — Carlos Barcena
*Assistant Examiner* — Wojciech Haske
(74) *Attorney, Agent, or Firm* — Capitol City TechLaw, PLLC; Samuel P. Burkholder

(57) ABSTRACT

There is provided a metal oxygen battery which is capable of obtaining superior batter capacity when starting use from charging. In the metal oxygen battery 1 including a positive electrode 2, which includes an oxygen-storing material and lithium oxide, and uses oxygen as an active substance, a negative electrode 3 capable of absorbing and discharging lithium ions, and an electrolyte layer 4 interposed between the positive electrode 2 and the negative electrode 3, in which the positive electrode 2, the negative electrode 3, and the electrolyte layer 4 are hermetically accommodated in a case 5, the oxygen-storing material has an oxygen amount stored at a start of charge time diluted.

2 Claims, 2 Drawing Sheets

(56) References Cited

FOREIGN PATENT DOCUMENTS

| | | |
|---|---|---|
| JP | 2008-1112724 A | 5/2008 |
| JP | 2008-270166 A | 11/2008 |
| JP | 2009-230985 A | 10/2009 |
| JP | 2010-108622 A | 5/2010 |
| JP | 2010-140821 A | 6/2010 |
| JP | 2011-146339 A | 7/2011 |
| JP | 5122021 B2 | 1/2013 |
| WO | 2010/082338 A1 | 7/2010 |
| WO | WO 2010082338 A1 * | 7/2010 |
| WO | 2010100752 A1 | 9/2010 |
| WO | 2010/131536 A1 | 11/2010 |
| WO | 2011087089 A1 | 7/2011 |
| WO | 2012025975 A1 | 3/2012 |

OTHER PUBLICATIONS

Shiga et al. JP 2009-230985 Machine translation.*

* cited by examiner

_METAL OXYGEN BATTERY_

BACKGROUND OF THE INVENTION

1. Field of the Invention

The present invention relates to a metal oxygen battery.

2. Description of the Related Art

Metal oxygen batteries have conventionally been known, which have a positive electrode using oxygen as an active substance, a negative electrode using a metal as an active substance, and an electrolyte layer interposed between the positive electrode and the negative electrode.

In the metal oxygen batteries, in the discharge time, a metal is oxidized to form metal ions at the negative electrode, and the formed metal ions migrate into the positive electrode side. On the other hand at the positive electrode, oxygen is reduced to form oxygen ions, and the formed oxygen ions bond with the metal ions to form a metal oxide. Further, in the charge time, at the positive electrode, the metal oxide formed by discharge is decomposed, and metal ions and oxygen ions are formed. The formed metal ions migrate into the negative electrode side. On the other hand, at the negative electrode the metal ions migrated into the negative electrode side are reduced and precipitated on the negative electrode.

In the metal oxygen battery, if metallic lithium is used as the metal, since the metallic lithium has a high theoretical potential and a large electrochemical equivalent weight, the metal oxygen battery can provide a large charge-discharge capacity. If oxygen in the air is used as the oxygen, since there is no need for filling a positive electrode active substance in a battery, the energy density per mass of the battery can be raised.

However, if the positive electrode is opened to the atmosphere in order to make oxygen in the air to be a positive electrode active substance, moisture, carbon dioxide and the like in the air invade in the battery, and there is caused a problem of deterioration of the electrolyte layer, the negative electrode and the like.

Then, in order to solve the problem, a metal oxygen battery is known, which has a positive electrode containing an oxygen-occluding material to release oxygen by reception of light, a negative electrode composed of metallic lithium, and an electrolyte layer disposed in a hermetically sealed case as a housing, and has a light transmission part to guide light to the oxygen-occluding material (for example, see Japanese Patent Laid-Open No. 2009-230985).

According, to the conventional metal oxygen battery equipped with the light transmission part, the metal oxygen battery can release oxygen from the oxygen-occluding material by guiding light to the oxygen-occluding material through the light transmission part, and can provide oxygen as a positive electrode active substance without exposing the positive electrode to the atmosphere. Therefore, the deterioration of the electrolyte layer, the negative electrode and the like due to the invasion of moisture, carbon dioxide and the like in the air into the battery can be prevented.

However, in the conventional metal oxygen battery, the supply of oxygen becomes unstable in the absence of irradiation of light rays, and there is a risk that the light transmission part, which is weaker than other pans of the hermetically sealed case, is broken and the electrolyte solution leaks out.

Then, it is conceivable that an oxygen-storing material which does not rely on irradiation of light rays and can occlude and release oxygen chemically, or adsorb and desorb oxygen physically is used as a positive electrode material of the metal oxygen battery. The oxygen-storing material is equipped with a function of occluding and releasing oxygen, and also is equipped with a function of adsorbing and desorbing oxygen on and from a surface thereof. Oxygen adsorbed on and desorbed from the surface of the oxygen-storing material is different from the oxygen occluded and released therefrom, and is not diffused in the oxygen storing material. Therefore, oxygen adsorbed on and resorbed from the surface of the oxygen-storing material is used for the balmy reaction with lower energy compared to the occluded and released oxygen, and it is conceivable that it acts favorably in the battery reaction.

In the metal oxygen battery, a typical usage is to start the use from discharge, however, it is conceivable to start the use from charging. In this case, in order to generate the decomposition reaction of the metal oxide at the positive electrode at the time of charging in the first cycle, it is conceivable to previously add the metal oxide to the positive electrode.

However, when starting use from charging in the metal oxygen battery equipped with a positive electrode including the oxygen-storing material and lithium oxide, and which is accommodated in a case, there is an inconvenience that charge-discharge overpotential is large, and sufficient batter capacity cannot not be obtained.

SUMMARY OF THE INVENTION

It is an object of the present invention to eliminate such inconvenience, and provide a metal oxygen battery capable of obtaining superior battery capacity when staring use from charging.

The present inventors have studied the reasons why the charge-discharge overpotential is large when starting use from charging, in a metal oxygen battery equipped with a positive electrode including an oxygen-storing material and lithium oxide, and which is accommodated in a case. As a result, it has been found that it is difficult for the oxygen-storing material to sufficiently occlude oxygen generated by decomposition of the lithium oxide.

a. That is, in the metal oxygen battery equipped with a positive electrode including lithium oxide together with the oxygen-storing material, and which is accommodated in a housing, when the use of the battery is started from charging, the lithium oxide contained in the positive electrode is decomposed in the positive electrode, and lithium ions and oxygen ions are generated. The generated lithium ions permeate into the negative electrode side, and the generated oxygen ions are stored in the oxygen-storing material.

At this time, since lame amount of oxygen has already been attached to the surface of the oxygen-storing material at a stage before start of charging, the oxygen-storing material cannot sufficiently store oxygen generated by decomposition of the lithium oxide. As a result, in the metal oxygen battery, when the battery is started to use from charging, it is conceivable that the decomposition reaction of the lithium oxide does not progress in the positive electrode, and that the charge overpotential becomes larger.

Further, when performing discharge after starting use of the battery from charging, in the negative electrode, metallic lithium is oxidized and lithium ions and electrons are generated, and the generated lithium ions permeate through an electrolyte layer and migrate into the positive electrode side. In the positive electrode, migrated lithium ions react with oxygen ions discharged from the oxygen-storing material or oxygen ions desorbed from the oxygen-storing material and reduced, and generate lithium oxide or lithium peroxide.

At this time, because of the amount of lithium ions migrated into the negative electrode side being small since the decomposition reaction of the lithium oxide in the positive electrode does not progress during the charging, the amount of lithium ions migrating into the positive electrode side from the negative electrode side becomes small. As a result, when performing discharge after starting use of the battery from charging, it is conceivable that the generating reaction of the lithium oxide or the lithium peroxide does not progress in the positive electrode, and the discharge overpotential becomes larger.

As such, it is conceivable to reduce the amount of oxygen attached to the surface of the oxygen-storing material at the stage before start of use.

The present invention has been made on the above-mentioned findings, and in order to achieve the above-mentioned object, a metal oxygen battery comprises a positive electrode comprising an oxygen-storing material and lithium oxide, and which uses oxygen as an active substance; a negative electrode which is capable of absorbing and discharging lithium ions; and an electrolyte layer interposed between the positive electrode and the negative electrode; in which the positive electrode, the negative electrode, and the electrolyte layer are hermetically accommodated in a housing; wherein the oxygen-storing material has an oxygen amount stored at a start of charge time diluted.

According to the metal oxygen battery of the present invention, when the battery is started to use from charging, in the positive electrode, lithium oxide contained in the positive electrode is decomposed, and lithium ions and oxygen ions are generated. The generated lithium ions migrate into the negative electrode side. The generated oxygen ions are directly occluded in the oxygen-storing material, or oxidized by discharging electrons to become oxygen molecules, and are adsorbed to the surface of the oxygen-storing material.

On the other hand, in the negative electrode, lithium ions migrated into the negative electrode side are reduced, become metallic lithium, and precipitate on the negative electrode, or lithium ions are directly absorbed in the negative electrode.

At this time, since the amount of oxygen stored in the oxygen-storing material at the start of charging is diluted, oxygen generated by decomposition of lithium oxide is easier to be occluded or adsorbed on and to the oxygen-storing material. As a result, when starting use from charging, the metal oxygen battery of the present invention is capable of further progressing the decomposition reaction of the lithium oxide in the positive electrode, and to reduce the charge overpotential.

Further, when performing discharge after starting use from charging, metallic lithium precipitated on the negative electrode is oxidized to become lithium ions, or the lithium ions adsorbed on the negative electrode is directly discharged. The lithium ions permeate through the electrolyte layer and migrate into the positive electrode side.

On the other hand, in the positive electrode, migrated lithium ions react with oxygen ions emitted from the oxygen-storing material or oxygen ions desorbed from the oxygen-storing material and reduced, and generate lithium oxide or lithium peroxide.

Then, by connecting the negative electrode and the positive electrode with a conducting wire, electric energy may be taken out.

At this time, by being capable of sufficiently securing the amount of lithium ions migrating into the negative electrode side by the progress of the decomposition reaction of the lithium oxide in the positive electrode during charging, it becomes possible to sufficiently secure the amount of lithium ions migrating into the positive electrode side from the negative electrode side. As a result, the metal oxygen battery of the present invention is capable of progressing the generating reaction of lithium oxide or lithium peroxide in the positive electrode at discharge time, and reducing the discharge overpotential.

Further, in the metal oxygen battery of the present invention, since the positive electrode and the like are hermetically accommodated in the housing, it becomes possible for the oxygen-storing material to surely maintain the diluted state of oxygen at the start of charge time.

Therefore, according to the metal oxygen battery of the present invention, superior battery capacity may be obtained when starting use from charging.

In the metal oxygen battery of the present invention, the oxygen-storing material is obtained by performing heating process to a composite metal oxide by holding the same under hydrogen atmosphere, and by removing oxygen from the surface of the composite metal oxide.

In the oxygen-storing material, by retaining the composite metal oxide under hydrogen atmosphere and performing heating process, oxygen molecules adsorbed on the surface of the composite metal oxide are removed as water molecules. By doing so, it becomes possible to obtain the oxygen-storing material with extremely few oxygen molecules adsorbed on the surface thereof.

In order to reduce the charge-discharge overpotential when starting use from charging, in the metal oxygen battery of the present invention, it is preferable that the oxygen-storing material has the oxygen amount in the range of 0 to 6 mmol/g stored at the time of charge start.

In the oxygen-storing material, when the oxygen amount exceeds 6 mmol/g, occluding of oxygen ions generated by the decomposition reaction of the lithium oxide at charge time into the oxygen-storing material, or adsorbing of the oxygen ions transformed to oxygen molecules on the surface of the oxygen-storing material, are hindered. As a result of the progress of the decomposition reaction of the lithium oxide being inhibited therefrom, there may be cases where the charge-discharge overpotential cannot be sufficiently reduced when starting use from charging.

Further, in the metal oxygen battery of the present invention, it is preferable that the oxygen-storing material is a composite metal oxide comprising Y and Mn. The composite metal oxide is superior in oxygen occluding/releasing performance or oxygen adsorbing/desorbing performance, so that the amount of oxygen occluded in or adsorbed on the oxygen-storing material may be increased. Therefore, according to the metal oxygen battery of the present invention in which the oxygen-storing material is the composite metal oxide including Y and Mn, it becomes possible to surely reduce the charge-discharge overpotential when starting use from charging.

DETAILED DESCRIPTION OF THE PREFERRED EMBODIMENTS

Figure 1:
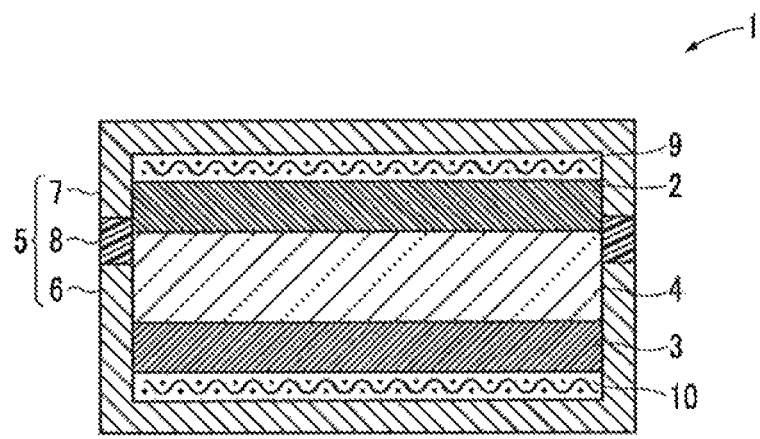
FIG. 1 is an illustrative cross-sectional diagram showing one constitution example of the metal oxygen battery according to the present invention.

Then, embodiments according to the present invention will be described in more detail by reference to accompanying drawings As shown in FIG. 1, a metal oxygen battery 1 according to the present embodiment comprises a positive electrode 2 including an oxygen-storing material and lithium oxide, a negative electrode 3 which is capable of absorbing and discharging lithium ions, and an electrolyte layer 4 disposed between the positive electrode 2 and the negative electrode 3, and the positive electrode 2, the negative electrode 3 and the electrolyte layer 4 are hermetically accommodated in a case 5.

The case 5 comprises a cup-shape case body 6, and a lid body 7 to close the case body 6, and a ring-shaped insulating resin 8 is interposed between the case body 6 and the lid body 7. The positive electrode 2 has a positive electrode current collector 9 between the top surface of the lid body 7 and the positive electrode 2, and the negative electrode 3 has a negative electrode current collector 10 between the bottom surface of the case body 6 and the negative electrode 3. Here, in the metal oxygen battery 1, the case body 6 acts as a negative electrode plate, and the lid body 7 acts as a positive electrode plate.

In the metal oxygen battery 1, the positive electrode 2 comprises the oxygen-storing material and lithium oxide, and further comprises a conductive material and a binder.

The oxygen-storing material comprises, for example, a composite metal oxide represented by a chemical formula $YMnO_3$, which has a function of occluding and releasing oxygen and also a function of adsorbing and desorbing oxygen on and from a surface thereof. The oxygen amount stored in the oxygen-storing material is diluted, and oxygen in the range of 0 to 6 mmol/g is stored. Further, as the oxygen-storing material, it is also possible to use a C type rare-earth structure composite metal oxide such as $Gd_{0.70}Y_{0.26}Ba_{0.04}O_{2.96}$, an apatite structure composite metal oxide such as $La_{9.33}Si_6O_{26}$ and $La_{8.33}SrSiO_{25.5}$, a delaffosite structure composite metal oxide such as $CuFeO_2$, $CuAlO_2$, $CuCrO$ and $CiYO_2$, a perovskite structure composite metal oxide such as $LaMnO_3$, $SrMnO_3$ and $SrFeO_3$, and a fluorite structure composite metal oxide such as $ZrO_2$ and $CeO_2$.

The lithium oxide includes, for example, lithium oxide ($Li_2O$) and lithium peroxide ($Li_2O_2$).

The conductive material includes, for example, carbon materials such as graphite, acetylene black, Ketjen Black, carbon nanotubes, mesoporous carbon and carbon fibers.

The binder includes polytetrafluoroethylene (PTFE) and polyvinylidene fluoride (PVDF).

The positive electrode 2 is manufactured as follows. First, the composite metal oxide is performed with a heating process of holding the same under a hydrogen atmosphere (a hydrogen concentration is approximately 100 volume %) in a pressure in the range of 0.1 to 5 MPa, and in a temperature in the range of 25 to 600° C., for a time in the range of 15 minutes to 2000 hours. As a result of removing oxygen from the surface of the composite metal oxide as water molecules by the heating process, the oxygen-storing material storing oxygen in the range of 0 to 6 mmol/g may be obtained.

Next, the obtained oxygen-storing material, the conductive material, the binder, and lithium oxide are mixed, and the obtained mixture is applied onto one surface of the positive electrode current collector 9, and is press bonded at a pressure in the range of 0.1 to 5 MPa. By doing so, the pellet-shaped positive electrode 2 may be obtained.

a. The negative electrode 3 is comprised of a material which is capable of absorbing and discharging lithium ions, and for example, a carbonaceous material such as metallic lithium, lithium alloy, graphite, and the like, may be given. In the present embodiment, metallic lithium is used as the negative electrode 3.

Then, the electrolyte layer 4 may be, for example, one in which a nonaqueous electrolyte solution is immersed in a separator, or a solid electrolyte.

The nonaqueous electrolyte solution usable is, for example, one in which a lithium salt is dissolved in a nonaqueous solvent. Lithium salt includes, for example, carbonate salts, nitrate salts, and acetate salts. The nonaqueous solvent includes, for example, carbonate esteric solvents, etheric solvents and ionic liquids.

The carbonate esteric solvent includes, for example, ethylene carbonate, propylene carbonate, dimethyl carbonate and diethyl carbonate. The carbonate esteric solvent may be used as a mixture of two or more.

The etheric solvent includes, for example, dimethoxyethane, dimethyltriglyme and polyethylene glycol. The etheric solvent may be used as a mixture of two or more.

The ionic liquid includes, for example, salts of cations such as imidazolium, ammonium, pyridinium and piperidinium, with anions such as bis(trifluoromethylsulfonyl)imide (TTSI), bis(pentafluoroethylsulfonyl)imide (BETI), tetrafluoroborates, perchlorates and halogen anions.

The separator includes, for example, glass fibers, glass papers, polypropylene nonwoven fabrics, polyimide nonwoven fabrics, polyphenylene sulfide nonwoven fabrics, and polyethylene porous films.

The solid electrolyte includes, for example, oxide-based solid electrolytes and sulfide-based solid electrolytes.

The oxide-based solid electrolytes includes, for example, $Li_7La_3Zr_2O_{12}$, which is a composite oxide of lithium, lanthanum and zirconium, and glass ceramics containing lithium, aluminum, silicon, titanium, germanium and phosphorus as main components. The $Li_7La_3Zr_2O_{12}$ may be on in which another metal such as strontium, barium, silver, yttrium, lead, tin, antimony, hafnium, tantalum and niobium is substituted far a part of each of lithium, lanthanum and zirconium.

Then, the current collectors 9 and 10 includes ones composed of meshes of titanium, stainless steel, nickel, aluminum, or the like.

In the metal oxygen battery 1 of the present embodiment, when the use is started from charging, lithium oxide (lithium oxide or lithium peroxide) contained in the positive electrode 2 is dissolved, and lithium ions and oxygen ions are generated at the positive electrode 2, as is shown in the following formula. The generated lithium ions permeate through the electrolyte layer 4 and migrate into the negative electrode 3 side. Further, the generated oxygen ions are occluded inside the oxygen-storing material, or are oxidized by emitting electrons becomes oxygen molecules, and are adsorbed on the surface of the oxygen-storing material. On the other hand, in the negative electrode 3, the lithium ions migrated into the negative electrode 3 side is reduced to become metallic lithium, and is precipitated on the negative electrode 3 or is absorbed inside the negative electrode.

(Positive Electrode) $2Li_2O \rightarrow 4Li^{30} + 2O^{2-}$ $Li_2O_2 \rightarrow 2Li^+ + 2O^{2-}$      a.

(Negative Electrode) $4Li^+ + 4e^- \rightarrow 4Li$

The composite metal oxide is performed with a heating process of holding the same under a hydrogen atmosphere, so as to remove oxygen from the surface of the composite metal oxide, the oxygen amount stored in the material is diluted so that the oxygen-storing material stores oxygen in the range of 0 to 6 mmol/g. By doing so, in the metal oxygen battery 1 of the present embodiment, oxygen is easier to occlude or adsorbed to the oxygen-storing material, when the battery is used from charging. As a result, the metal oxygen battery 1 of the present embodiment is capable of further progressing the decomposition reaction of the lithium oxide at the positive electrode 2, and to reduce the charge overpotential, when the battery is started to use from charging.

Further, when performing discharge after starting use of the battery from charging, in the negative electrode 3, metallic lithium is oxidized and lithium ions and electrons are emitted, as is shown in the formulae. The lithium ions moves inside the electrolyte layer 4, and migrate into the positive electrode 2 side. On the other hand, in the positive electrode 2, oxygen molecules desorbed from the surface of the oxygen-storing material is reduced to generate oxygen ions. Or, oxygen ions are emitted from inside the oxygen-storing, material. Thereafter, the oxygen ions and the lithium ions bond together, and lithium oxides are generated.

Further, by connecting the negative electrode 3 and the positive electrode 2 with a conducting wire, electric energy may be taken out.

(Negative Electrode) $4Li \rightarrow 4Li^+ + 4e^-$ 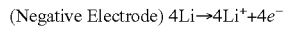

(Positive Electrode) $O_2 + 4e^- \rightarrow 2O^{2-}$ 

$4Li^+ + 2O^{2-} \rightarrow 2Li_2O$ 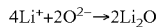 a.

$2Li^+ + 2O^{2-} \rightarrow Li_2O_2$ 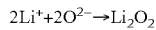 b.

On the other hand, in the charge time, by sufficiently securing the amount of lithium ions migrating to the negative electrode 3 side by progressing the decomposition reaction of the lithium oxide in the positive electrode 2, it becomes possible to sufficiently secure the amount of lithium ions migrating to the positive electrode 2 side from the negative electrode 3 side. As a result, the metal oxygen battery 1 of the present embodiment is capable of progressing the generating reaction of lithium oxide or lithium peroxide at the positive electrode 2 in the discharge time, and is capable of reducing the discharge overpotential.

Further, in the metal oxygen battery 1 of the present embodiment, the positive electrode 2 and the like are hermetically accommodated in the case 5, so that the oxygen-storing material is capable of surely maintaining the diluted state of oxygen at the start of charge time.

Therefore, according to the metal oxygen battery 1 of the present embodiment superior battery capacity may be obtained when starting use from charging.

When the oxygen amount stored in the oxygen-storing material exceeds 6 mmol/g when starting use from charging, it prevents oxygen ions generated by the decomposition reaction of the lithium oxide from being occluded in the oxygen-storing material and from the oxygen ions from becoming oxygen molecules and being adsorbed to the surface of the oxygen-storing material. As a result, by inhibiting progress of the decomposition reaction of the lithium oxide, there may be cases where charge-discharge overpotential cannot be reduced fully when starting use from charging.

In the metal oxygen battery 1 of the present embodiment, in the charge time from the second cycle on, the reaction exactly the same as in the charge time in the first cycle mentioned above occurs, except that lithium oxide generated by the discharge is decomposed in the positive electrode 2, in addition to the lithium oxide contained in the positive electrode 2 from the fabrication stage.

Then, Examples and Comparative Examples are shown.

Example 1

In the present Example, first, yttrium nitrate pentahydrate, manganese nitrate hexahydrate and malic acid in a molar ratio of 1:1:6 were crushed and mixed to thereby obtain a mixture of a composite metal oxide material. Then, the obtained mixture of the composite metal oxide material was reacted at a temperature of 250° C. for 30 minutes, and thereafter further reacted at a temperature of 300° C. for 30 minutes and at a temperature of 350° C. for 1 hour. Then, the mixture of the reaction product was crushed and mixed, and thereafter calcined at a temperature of 1,000° C. for 1 hour to thereby obtain a composite metal oxide represented by a chemical formula $YMnO_3$.

Then, the complex metal oxide was placed in a pressure tight case, and was heat treated under the hydrogen atmosphere (the hydrogen concentration is approximately 100 volume %) at a pressure of 2 MPa, and in a temperature of 400° C. for 15 minutes. Then, the pressure tight case was depressurized from 2 MPa to the pressure of 1 Pa in 10 seconds with a vacuum pump, and was retained for 15 minutes. Then, the oxygen-storing material was obtained by performing, taking the above-mentioned heating process and the above-mentioned decompression as one cycle, a total of 100 cycles.

Then, the obtained oxygen-storing material was accommodated in a sample tube made of quarts with a diameter of 12 mm, and the sample tube was set in a tubular furnace. He gas containing $H_2$ of 10 volume % was introduced into the sample tube at a flow rate of 40 ml/min from an inlet side of the sample tube. Thereafter, $H_2$ gas concentration was measured at an outlet side of the sample tube, and was retained until $H_2$ gas concentration became constant.

Then, while introducing He gas containing $H_2$ into the sample tube, the temperature of the tubular furnace was elevated to 600° C. at a speed of 5° C./min, and the $H_2O$ concentration in the gas elected from the outlet side of the sample tube during elevation of temperature was measured. When the oxygen amount stored in the oxygen-storing material was determined from the measured $H_2O$ concentration, it was 3.5 mmol/g. The oxygen amount corresponds to oxygen amount stored at the start of charge time.

Then, the oxygen-storing material obtained in the present Example, Ketjen Black as a conductive material, a polytetrafluoroethylene (PTFE, made by Daikin Industries, Ltd.) as a binder, and lithium peroxide ($Li_2O_2$, made by Kojundo Chemical Laboratory Co., Ltd.) were mixed in a mass ratio of 8:1:1:4 to thereby obtain a positive electrode mixture. Then, the obtained positive electrode mixture was press bonded at a pressure of 5 MPa on one side of a positive electrode current collector 9 composed of an aluminum mesh to thereby form a positive electrode 2 of 15 mm in diameter and 1 mm in thickness.

Then, a negative electrode current collector 10 of 15 mm in diameter composed of a SUS mesh was arranged inside a bottomed cylindrical SUS-made case body 6 of 15 mm in inner diameter, and a negative electrode 3 of 15 mm in diameter and 0.1 mm in thickness composed of metallic lithium was superposed on the negative electrode current collector 10.

Then, a separator of 15 mm in diameter composed of a polyolefin-made flat membrane (made by Asahi Kasei E-materials Corp.) was superposed on the negative electrode 3. Then, the positive electrode 2 and the positive electrode current collector 9 obtained as described above were superposed on the separator so that the positive electrode 2 contacted with the separator. Then, as nonaqueous electrolyte solution was injected in the separator to thereby form an electrolyte layer 4.

As the nonaqueous electrolyte solution used was a solution (made by Kishida Chemical Co., Ltd) in which lithium bis (trifluoromethanesulfonyl)imide (LiTFSI) as a supporting salt was dissolved in a concentration of 1 mol/L in dimethoxyethane as a solvent.

Then, a laminate comprising the negative electrode current collector 10, the negative electrode 3, the electrolyte layer 4, the positive electrode 2, and the positive electrode current collector 9 accommodated in the case body 6 was closed by a bottomed cylindrical SUS-made lid body 7 or 17 mm in inner diameter. At this time, a ring-shape insulating resin 8 of 32 mm in outer diameter, 30 mm in inner diameter and 5 mm in thickness composed of a polytetrafluoroethylene (PTFE) was disposed between the case body 6 and the lid body 7 to thereby obtain a metal oxygen battery 1 shown in FIG. 1. In the metal oxygen battery 1, the positive electrode 2, the negative electrode 3, and the electrolyte layer 4 are hermetically accommodated in the case 5.

Figure 2:
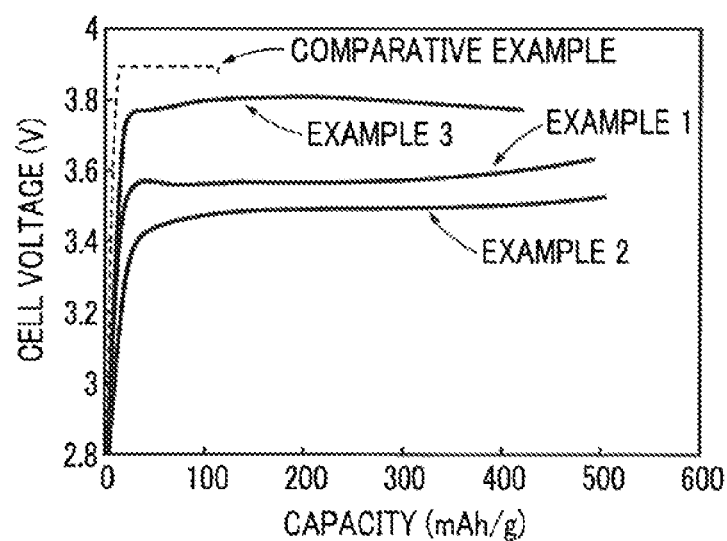
FIG. 2 is a graph showing a relationship between a charge capacity and a cell voltage according to the metal oxygen battery an Example of the present invention.
Figure 3:
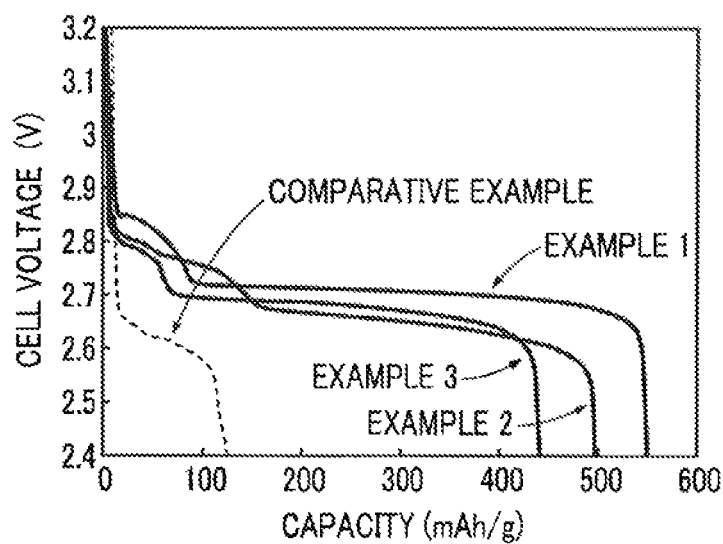
FIG. 3 is a graph showing a cycle performance of the metal oxygen battery according to an Example of the present invention.

Then, the metal oxygen battery 1 obtained in the present Example was loaded on an electrochemical measuring apparatus (made by Toho Technical Research Co., Ltd.); and a current of 0.2 mA/cm$^2$ was applied between the negative electrode 3 and the positive electrode 2, and a constant-current charge was carried out until the cell voltage became 3.9 V. When the cell voltage reached 3.9V, it was switched to constant-voltage charge, and charge was performed until current value became 0.015 mA/cm$^2$. Then, a current of 0.2 mA/cm$^2$ was applied between the negative electrode 3 and the positive electrode 2, and discharge was carried out until the cell voltage became 2.0V. The relationship between the obtained charge capacity and the cell voltage is shown in FIG. 2, and the relationship between the obtained discharge capacity and the cell voltage is shown in FIG. 3.

Example 2

In the present Example, the oxygen-storing material was obtained exactly the same as in Example 1, except for performing the heating process by retaining the composite metal oxide at as temperature of 500° C.

Then, the stored oxygen amount was measured exactly the same as in Example 1, except for using the oxygen-storing material obtained in the present Example, and it was 0.05 mmol/g.

Then, the metal oxygen battery 1 was obtained exactly the same as in Example 1, except for using the oxygen-storing material obtained in the present Example.

Then, charge and discharge was performed exactly the same as in Example 1, except for using the metal oxygen battery 1 obtained in the present Example. The relationship between the obtained charge capacity and the cell voltage is shown in FIG. 2, and the relationship between the obtained discharge capacity and the cell voltage is shown in FIG. 3.

Example 3

In the present Example, the oxygen-storing material was obtained exactly the same as in Example 1, except for performing the heating process by retaining the composite metal oxide at a temperature of 150° C.

Then, the stored oxygen amount was measured exactly the same as in Example 1, except for using the oxygen-storing material obtained in the present Example, and it was 5.85 mmol/g.

Then, the metal oxygen battery 1 was obtained exactly the same as in Example 1, except tor using the oxygen-storing material obtained in the present Example.

Then, charge and discharge was performed exactly the same as in Example 1, except for using the metal oxygen battery 1 obtained in the present Example. The relationship between the obtained charge capacity and the cell voltage is shown in FIG. 2, and the relationship between the obtained discharge capacity and the cell voltage is shown in FIG. 3.

Comparative Example 1

In the Comparative Example, the composite metal oxide was obtained exactly the same as in Example 1. Then, the composite metal oxide itself was made into the oxygen-storing material without performing the heating process to the composite metal oxide at all. The oxygen-storing material is in the state where stored oxygen amount is not diluted.

Then, the stored oxygen amount was measured exactly the same as in Example 1, except for using the oxygen-storing material obtained in the present Comparative Example, and it was 6.65 mmol/g.

Then, the metal oxygen battery 1 was obtained exactly the same as in Example 1, except for using the oxygen-storing material obtained in the present Comparative Example.

Then, charge and discharge was performed exactly the same as in Example 1, except for using the metal oxygen battery 1 obtained in the present Comparative Example. The relationship between the obtained charge capacity and the cell voltage is shown in FIG. 2, and the relationship between the obtained discharge capacity and the cell voltage is shown in FIG. 3.

From FIG. 2, it is clear that the metal oxygen batteries 1 of Example 1 to 3 has smaller voltage in a steady state and has reduced charge overpotential, and has superior charge capacity, compared to the metal oxygen battery of Comparative Example 1. It is also clear from FIG. 3 that the metal oxygen batteries 1 of Examples 1 to 3 has larger voltage in a steady state and has reduced discharge overpotential, and has superior discharge capacity, compared to the metal oxygen battery of Comparative Example 1.

EXPLANATION OF REFERENCES

1 . . . Metal oxygen battery, 2 . . . positive electrode, 3 . . . negative electrode, 4 . . . electrolyte layer, 5 . . . case (housing).

What is claimed is:
1. A metal oxygen battery comprising:
   a positive electrode comprising an oxygen-storing material and lithium oxide, and which uses oxygen as an active substance;
   a solid negative electrode which is capable of absorbing and discharging lithium ions;
   an electrolyte layer interposed between the positive electrode and the negative electrode, and
   a hermetically sealed housing accommodating the positive electrode, the negative electrode, and the electrolyte layer;
   wherein the oxygen-storing material has a function of occluding and releasing oxygen and also a function of adsorbing and desorbing oxygen on and from a surface thereof without receiving light beam has an oxygen amount more than 0 mmol/g and less than or equal to 6 mmol/g at a start of charge time, and the oxygen-storing material is a composite metal oxide comprising Y and Mn;

wherein the positive electrode has a positive electrode current collector located on its top surface and directly contacting with a top surface of the housing, the negative electrode has a negative electrode current collector located on its bottom surface and directly contacting with a bottom surface of the housing, the positive electrode directly contacts with each of the positive electrode collector, the electrolyte layer and an inner peripheral surface of the housing at each of a top surface, a bottom surface, and a peripheral surface thereof, and the negative electrode directly contacts with each of the negative electrode collector, the electrolyte layer and the inner peripheral surface of the housing at each of a bottom surface, a top surface, and a peripheral surface thereof.

2. The metal oxygen battery according to claim 1, wherein the hermetically sealed housing comprises a metal-made cup-shape case body, a metal-made lid body, and a ring-shaped insulating resin interposed between the metal-made cup-shape case body and the metal-made lid body.

* * * * *